United States Patent
Arnett et al.

(10) Patent No.: US 10,810,203 B2
(45) Date of Patent: Oct. 20, 2020

(54) EXTENDING THE SQL LANGUAGE TO ALLOW THE REFERENCE OF A NAMED DATA MODEL

(71) Applicant: Tendron Software LLC, Plainville, MA (US)

(72) Inventors: Paul J. Arnett, Meriden, CT (US); Kenneth D. Arnett, East Hartland, CT (US)

(73) Assignee: TENDRON SOFTWARE LLC, Plainville, MA (US)

( * ) Notice: Subject to any disclaimer, the term of this patent is extended or adjusted under 35 U.S.C. 154(b) by 289 days.

(21) Appl. No.: 15/883,943

(22) Filed: Jan. 30, 2018

(65) Prior Publication Data
US 2019/0236190 A1 Aug. 1, 2019

(51) Int. Cl.
*G06F 16/00* (2019.01)
*G06F 16/2453* (2019.01)
*G06F 16/21* (2019.01)

(52) U.S. Cl.
CPC ........ *G06F 16/24549* (2019.01); *G06F 16/21* (2019.01)

(58) Field of Classification Search
CPC ............... G06F 16/284; G06F 16/2445; G06F 16/2452; G06F 16/24526; G06F 16/24544; G06F 16/24549
See application file for complete search history.

(56) References Cited

U.S. PATENT DOCUMENTS

| | | | | |
|---|---|---|---|---|
| 7,076,477 | B2 * | 7/2006 | Lin | G06F 16/24545 |
| 10,146,822 | B1 * | 12/2018 | Varteresian | G06F 16/2282 |
| 2002/0059191 | A1 * | 5/2002 | Tamura | G06F 16/24537 |
| 2003/0163461 | A1 * | 8/2003 | Gudbjartsson | G06F 16/284 |
| 2006/0282423 | A1 * | 12/2006 | Al-Omari | G06F 16/24544 |
| 2007/0219943 | A1 | 9/2007 | Draughn, Jr. | |
| 2010/0153430 | A1 * | 6/2010 | Mordvinov | G06F 16/24526 707/769 |
| 2017/0097970 | A1 * | 4/2017 | Bendel | G06F 16/252 |
| 2018/0018368 | A1 * | 1/2018 | Baeuerle | G06F 16/24544 |

OTHER PUBLICATIONS

Shashi Kant Gupta and Faisal Siddiqui, (Year: 2014), "Secure Data Storage and Retrieval in the Cloud", pp. 35-43.*

* cited by examiner

*Primary Examiner* — Merilyn P Nguyen
(74) *Attorney, Agent, or Firm* — Christopher & Weisberg, P.A.

(57) ABSTRACT

A method and system for extending a structured query language to allow reference of a named data model are provided. In some embodiments, a substitute SELECT statement having at least one JOIN statement based on an abbreviated SELECT statement having no JOIN statements is created by a translation module. The process of translation includes identifying tables of a data model referenced by an abbreviated SELECT statement having no JOIN statements. The process further includes determining relationships between the tables referenced by the abbreviated SELECT statement. The process also includes generating a substitute SELECT statement having a sequence of JOIN statements based on the determined relationships.

21 Claims, 3 Drawing Sheets

EXTENDING THE SQL LANGUAGE TO ALLOW THE REFERENCE OF A NAMED DATA MODEL

TECHNICAL FIELD

The present invention relates to a method and system for extending a structured query language to allow reference of a named data model.

BACKGROUND

Databases are computerized information storage and retrieval systems. A Relational Database Management System (RDBMS) is a database management system (DBMS) which uses relational techniques for storing and retrieving data. RDBMS software using a Structured Query Language (SQL) interface is well known in the art. The SQL interface has evolved into a standard language for RDBMS software and has been adopted as such by both the American National Standards Organization (ANSI) and the International Standards Organization (ISO). In a RDBMS, data is organized in tables having columns and rows. The SQL interface allows users to formulate relational operations on the tables interactively.

A structured query language (SQL) is a language used in programming and managing data in the RDBMS. SQL enables access of many records with a single statement and enables access to a single entry in one of a plurality of tables having many entries. A common SQL query is a SELECT statement as follows:
SELECT column1, column 2 . . . .
FROM table_name;
which returns a result table that consists of the data of column1 and column2 from the table named table_name.

A SELECT statement may be combined with a WHERE statement as follows:
SELECT column1
FROM Customers;
WHERE CustomerID=1;
which returns entries from column1 of the Customers table where the Customer ID=1.

A JOIN statement may also be used such as the following:
SELECT Orders.OrderID, Customers.CustomerName, Orders.OrderDate
FROM Orders
INNER JOIN Customers ON Orders.CustomerID= Customers.CustomerID
which returns all rows from both tables Orders and Customers as long as there is a match between the respective columns. Orders.OrderID and Customer.CustomerID. If there are records in the table Orders that do not have matches in table Customers, those records will not be returned.

The following SQL statement selects all orders with customer and shipper information that are common to tables named Orders, Customers and Shippers, using multiple JOIN statements:
SELECT Orders.OrderID, Customers.CustomerName, Shippers.ShipperName
FROM Orders
JOIN Customers ON Orders.CustomerID=Customers. CustomerID
JOIN Shippers ON Orders.ShipperID=Shippers.ShipperID;

There are many other SQL statements for retrieving select data from a database. In order to specify a query with JOIN statements for a relational database involving more than one source table, column pairs from different tables need to be identified to describe how these tables are to be joined. It can be difficult to define the JOINS when the query involves a large number of columns.

SUMMARY

The present embodiments advantageously provide a method and system for extending a structured query language to allow reference of a named data model. In some embodiments, a substitute SELECT statement having at least one JOIN statement based on an abbreviated SELECT statement having no JOIN statements is created by a translation module. The process of translation includes identifying tables of a data model referenced by an abbreviated SELECT statement having no JOIN statements. The process further includes determining relationships between the tables referenced by the abbreviated SELECT statement. The process also includes generating a substitute SELECT statement having a sequence of JOIN statements based on the determined relationships.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
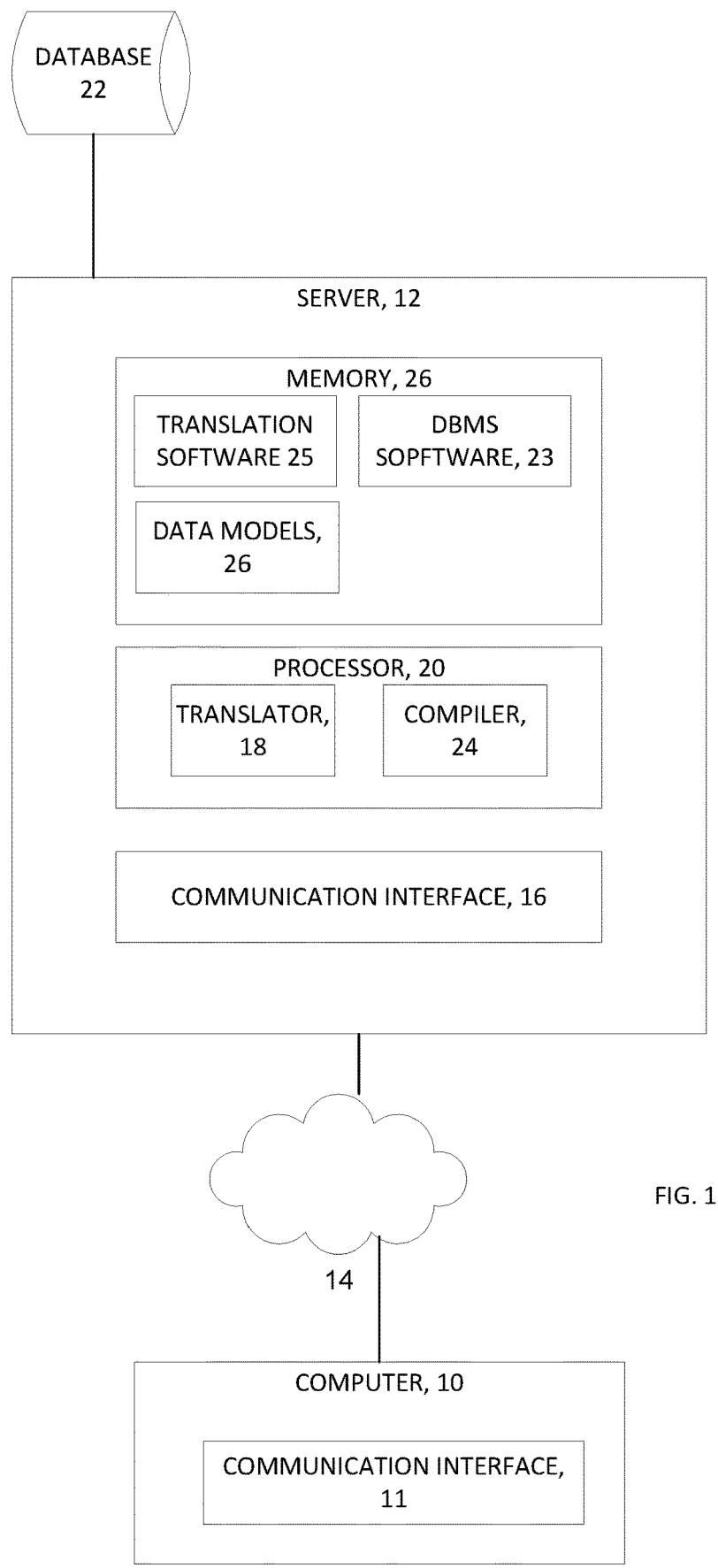
FIG. 1 is a block diagram of an embodiment of a computer network having a database and software to access the database.

Before describing in detail exemplary embodiments, it is noted that the embodiments reside primarily in combinations of apparatus components and processing steps related to extending a structured query language to allow reference of a named data model. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

When a user of a database wants to retrieve data from a database, he or she may enter a SELECT statement such as the SELECT statement above that includes the JOIN statements. However, in embodiments disclosed herein, the user is able to enter an abbreviated JOIN statement without needing to include JOIN statements. Referring to FIG. 1, this abbreviated SELECT statement (or other query) may be entered via a computer 10 having a communication interface 11, which, in a distributed network, may send the query to a remote server 12, via the Internet and/or other communication network 14. The server 12 has a communication interface 16 for receiving queries from the computer 10 and sending query results to the computer 10. The server 12 may receive a query and translate, via a translator 18, the query to a substitute query that may be executable by a processor 20 to cause retrieval of data from a database 22 which stores the actual data of the database. The server 12 may also include a compiler 24 to compile SQL language to convert it to instructions executable by the processor 20 that can respond to SQL statements. The compiled software may be stored in the memory 26 as DBMS software 23.

In some embodiments, a simplified procedure for selecting data from a database using an abbreviated SELECT statement is provided. Such abbreviated SELECT statement has no JOIN statements but is interpreted by the translator 18 to determine JOIN statements that may be employed to retrieve the data intended to be retrieved by the drafter of the abbreviated SELECT statement. For example, consider the following abbreviated SELECT statement:

DMSELECT E.ColumnB, E.ColumnC, F.ColumnA, G.LookupColumn
FROM SampleDM
WHERE G.ColumnA='Value 1' AND H.ColumnD='Value2'

Figure 2:
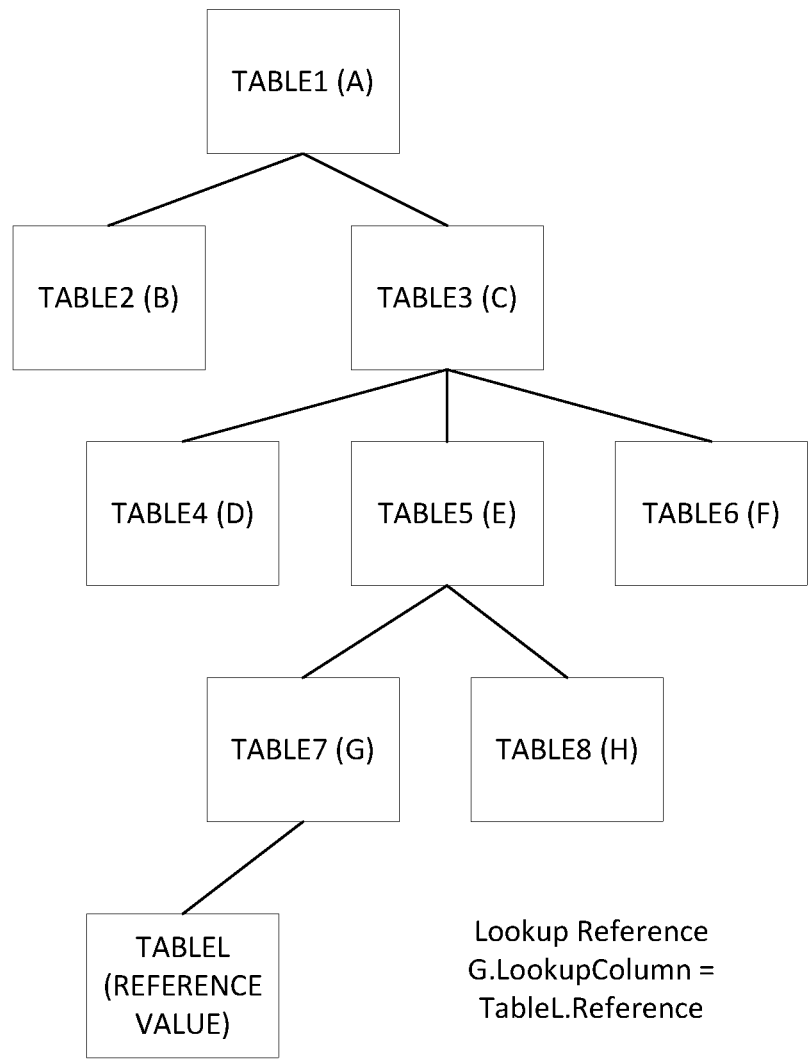
FIG. 2 is diagram of an example of a data model.

The DMSELECT clause refers to a Data Model named SampleDM such as the data model shown in FIG. 2. The translator 18, upon receiving the abbreviated SELECT statement, performs steps to translate the abbreviated SELECT statement to a substitute SELECT statement. First, translator 18 identifies the data model and the tables of the data model that are referenced by the abbreviated SELECT statement. In particular, the translator 18 identifies the SampleDM data module and the referenced tables E, F, G, and H. The translator 18 then determines the relationships between the referenced tables. Based on these relationships, the translator 18 generates a substitute SELECT statement having a sequence of JOIN statements.

In more detail, the translator 18 may perform the steps of determining relationships between the referenced tables by first building a list of parent/child table relationships as follows:
A\B
A\C
C\D
C \E
C \F
E \G
E \H In addition, the translator 18 may build a list of lookup references, which in this example, are as follows:
G.LookupColumn=TableL.Reference,
Value=TableL.Value The translator 18 then builds a root path for each table referenced in the abbreviated SELECT statement, the root path indicating a referenced table's lineage relationship to the root table, as follows:
the root path for table E is A\C\E
the root path for table F is A\C\F
the root path for table G is A\C\E\G
the root path for table H is A\C\E\H The translator 18 may then compare the root paths to determine the lowest common table in a hierarchy that is common to every determined hierarchy of tables. In this example, that table is Table C. Then, a FROM statement is formed as follows: "FROM Table 3 as C."

Also, for each root path a JOIN statement is formed at or below the lowest common parent table, in this case Table C. For this example, the JOIN statements are as follows:
JOIN Table5 as E on C.Column=E.Column
JOIN Table6 as F on C.Column=F.Column
JOIN Table7 as G on E.Column=G.Column
JOIN Table8 as H on E.Column=H.Column Also, for each lookup used in the abbreviated SELECT statement a JOIN statement is formed with a reference replaced with a reference to its lookup column. For a third normal form lookup reference, the JOIN statement will contain a WHERE statement. This results in the following statements:
JOIN TableL on G.LookupColumn=TableL.Reference
WHERE G.ColumnA='Value 1' AND H.ColumnD='Value2'

The completed substitute SELECT statement translated from the abbreviated SELECT statement is as follows:
SELECT E.ColumnB, E.ColumnC, F.ColumnA, TableL.Reference as LookupColumn
FROM Table3 as C
JOIN Table5 as E on C.Column=E.Column
JOIN Table6 as F on C.Column=F.Column
JOIN Table7 as G on E.Column=G.Column
JOIN Table8 as H on E.Column=H.Column
JOIN TableL on G.LookupColumn=TableL.Reference
WHERE G.ColumnA='Value 1' AND H.ColumnD='Value2'

This substitute SELECT statement from the translator 18 may be executed by the processor 20 to retrieve data according to the terms of the substitute SELECT statement.

Figure 3:
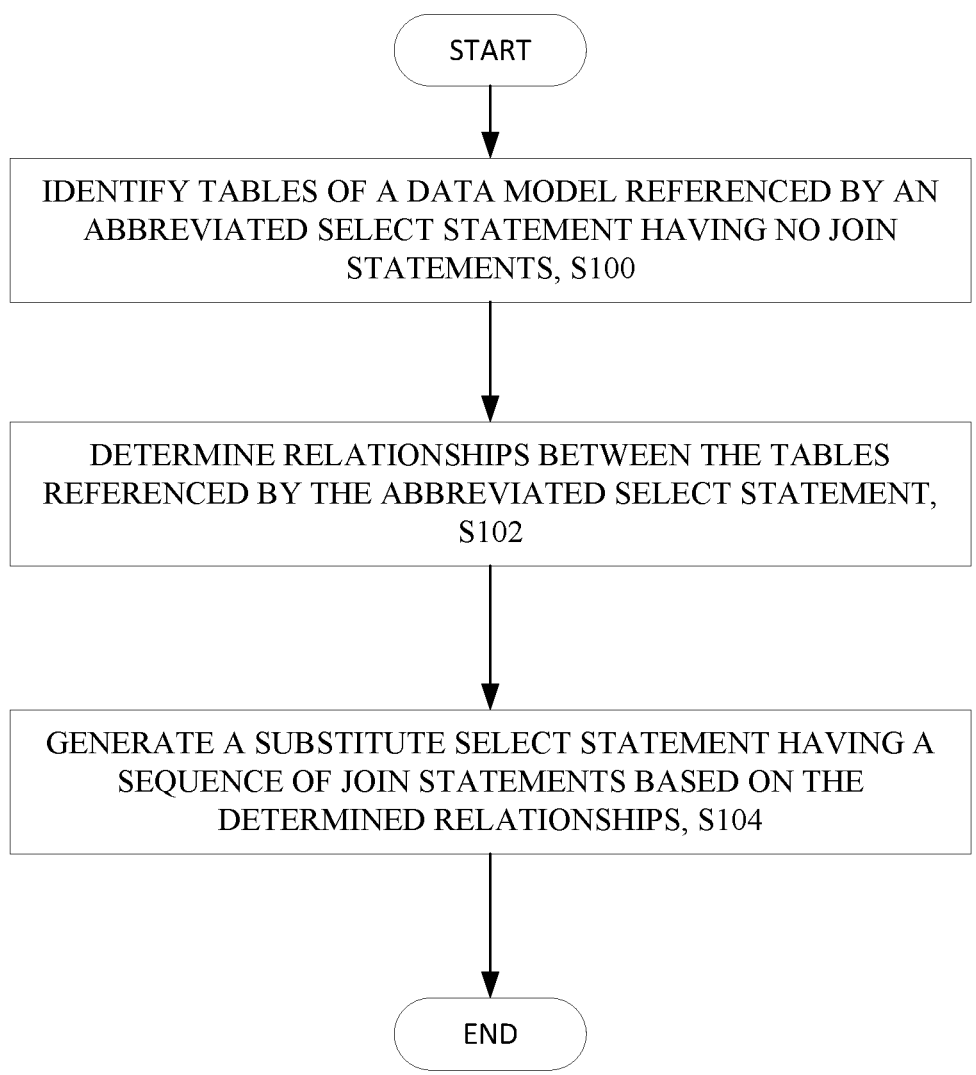
FIG. 3 is a flowchart of an exemplary process for translating an abbreviated SELECT statement to a substitute SELECT statement.

FIG. 3 is a flowchart of an exemplary process for building a substitute SELECT statement having at least one JOIN statement based on an abbreviated SELECT statement having no JOIN statements. The process includes identifying tables of a data model referenced by an abbreviated SELECT statement having no JOIN statements (block S100). The process further includes determining relationships between the tables referenced by the abbreviated SELECT statement (block S102). The process also includes generating a substitute SELECT statement having a sequence of JOIN statements based on the determined relationships (block S104).

In some embodiments, determining relationships between the tables referenced by the abbreviated SELECT statements includes determining, for each table referenced by the abbreviated SELECT statement, a hierarchy of tables from a root table to the referenced table. In some embodiments, determining relationships further includes identifying a lowest common table in a hierarchy that is common to every determined hierarchy of tables. In some embodiments, generating a substitute SELECT statement includes generating a FROM statement that references the identified lowest common table. In some embodiments, generating a substitute SELECT statement further includes generating, for each table referenced by the abbreviated SELECT statement, a JOIN statement for each relationship in the hierarchy between the identified lowest common table and the table referenced by the abbreviated SELECT statement. In some embodiments, the process also includes replacing a lookup column reference of the abbreviated SELECT statement to a new reference that includes a column reference of a particular table. In some embodiments, the method further includes including a JOIN statement that references the particular table.

The steps for generating a substitute SELECT statement having at least one JOIN statement from an abbreviated SELECT statement having no JOIN statements may be embodied in computer code (translation software 25) that is compiled to be executed by the translator 18 of the processor 20. The compiled computer code for translation can be stored in the memory 26. Thus, the memory 26 may be configured to store DBMS software 23 which may include standard or proprietary DBMS software to enable the processor to store and retrieve data in the database 22 and the memory 26 may also be configured to store translation software 25 to translate the abbreviated SELECT statements to substitute SELECT statements that may then be executed in accordance with the DBMS software 23. Therefore, in some embodiments, the translation software 25 may be compiled together with the standard DBMS software 23 or they may be compiled separately at different times. Thus, the translation software 25 may be compiled and provided separately from the standard or proprietary DBMS software and linked thereto, or the translation software 25 and the standard or proprietary DBMS software may be provided as a single software package.

For example, in some embodiments, the translation software may be installed as an add on database to a conventional database such as: a Microsoft SQL server-side database using the RESTORE DATABASE T-SQL command; the Oracle Server-side database using a RECOVER DATABASE RMAN command; an IBM UDB and DB2 server-side database using a RESTORE DATABASE CLP command; or a MySQL add-on for native support of the abbreviated SELECT command.

In some embodiments, the translation software 25 described above may reside at user computer 10 and/or the server 12. Thus, when a user of the database selects data to be retrieved by inputting an abbreviated SELECT statement, the abbreviated SELECT statement may be translated into a substitute SELECT statement at the computer 10 or the server 12. In either case, the substitute SELECT statement may be presented to the user at computer 10 by display on a video monitor.

Note that the memory 26 may also be configured to store data models, such as the data model of FIG. 2. The translator 18 may base a translation of an abbreviated SELECT statement on a data model stored in the memory 26 and referenced by the abbreviated SELECT statement.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (thereby creating a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A computer implemented method for extending a structured query language, SQL, the method comprising:
   identifying tables of a data model referenced by an abbreviated SELECT statement having no JOIN statements;
   determining relationships between the tables referenced by the abbreviated SELECT statement; and
   generating a substitute SELECT statement having a sequence of JOIN statements based on the determined relationships.

2. The method of claim 1, wherein determining relationships includes determining, for each table referenced by the abbreviated SELECT statement, a hierarchy of tables from a root table to the referenced table.

3. The method of claim 2, wherein determining relationships further includes identifying a lowest common table in a hierarchy that is common to every determined hierarchy of tables.

4. The method of claim 3, wherein generating a substitute SELECT statement includes generating a FROM statement that references the identified lowest common table.

5. The method of claim 4, wherein generating a substitute SELECT statement further includes generating, for each table referenced by the abbreviated SELECT statement, a JOIN statement for each relationship in the hierarchy between the identified lowest common table and the table referenced by the abbreviated SELECT statement.

6. The method of claim 1, further comprising replacing a lookup column reference of the abbreviated SELECT statement to a new reference that includes a column reference of a particular table.

7. The method of claim 6, further comprising including a JOIN statement that references the particular table.

8. A computer configured to implement a database, the computer responsive to an abbreviated SELECT statement having no JOIN statements, the computer to perform functionally as if a substitute SELECT statement having JOIN statements is executed, the computer comprising:
   memory configured to store relationships between tables of the database; and
   a translator responsive to query language and configured to:
   identify tables referenced by the abbreviated SELECT statement;
   determine relationships between tables referenced by the abbreviated SELECT statement; and
   perform operations in conformance with the substitute SELECT statement, the JOIN statements of the substitute SELECT statement being based on the determined relationships.

9. The computer of claim 8, wherein determining relationships includes determining, for each table referenced by the abbreviated SELECT statement, a hierarchy of tables from a root table to the referenced table.

10. The computer of claim 9, wherein determining relationships further includes identifying a lowest common table in a hierarchy that is common to every determined hierarchy of tables.

11. The computer of claim 10, wherein generating a substitute SELECT statement includes generating a FROM statement that references the identified lowest common table.

12. The computer of claim 11, wherein the substitute SELECT statement includes, for each table referenced by the abbreviated SELECT statement, a JOIN statement for each relationship in the hierarchy between the identified lowest common table and the table referenced by the abbreviated SELECT statement.

13. The computer of claim 8, further comprising replacing a lookup column reference of the abbreviated SELECT statement to a new reference that includes a column reference of a particular table.

14. The computer of claim 13, further comprising including a JOIN statement that references the particular table.

15. A computer-readable medium storing computer code that when executed by a processor, causes the processor to:
   identify tables of a data model referenced by an abbreviated SELECT statement having no JOIN statements;
   determine relationships between the tables referenced by the abbreviated SELECT statement; and
   generate a substitute SELECT statement having a sequence of JOIN statements based on the determined relationships.

16. The computer-readable medium of claim 15, determining relationships includes determining, for each table referenced by the abbreviated SELECT statement, a hierarchy of tables from a root table to the referenced table.

17. The computer-readable medium of claim 16, wherein determining relationships further includes identifying a lowest common table in a hierarchy that is common to every determined hierarchy of tables.

18. The computer-readable medium of claim 17, wherein generating a substitute SELECT statement includes generating a FROM statement that references the identified lowest common table.

19. The computer-readable medium of claim 18, wherein generating a substitute SELECT statement further includes generating, for each table referenced by the abbreviated SELECT statement, a JOIN statement for each relationship in the hierarchy between the identified lowest common table and the table referenced by the abbreviated SELECT statement.

20. The computer-readable medium of claim 15, further comprising replacing a lookup column reference of the abbreviated SELECT statement to a new reference that includes a column reference of a particular table.

21. The computer-readable medium of claim 20, further comprising including a JOIN statement that references the particular table.

* * * * *